United States Patent
Roturier et al.

(10) Patent No.: US 11,194,925 B1
(45) Date of Patent: Dec. 7, 2021

(54) USER-BASED CYBER RISK COMMUNICATIONS USING PERSONALIZED NOTIFICATIONS

(71) Applicant: NortonLifeLock Inc., Tempe, AZ (US)

(72) Inventors: Johann Roturier, Maynooth (IE); Petros Efstathopoulos, Los Angeles, CA (US)

(73) Assignee: NortonLifeLock inc., Tempe, AZ (US)

( * ) Notice: Subject to any disclaimer, the term of this patent is extended or adjusted under 35 U.S.C. 154(b) by 435 days.

(21) Appl. No.: 16/224,358

(22) Filed: Dec. 18, 2018

(51) Int. Cl.

| | |
|---|---|
| *G06F 21/00* | (2013.01) |
| *G06F 21/62* | (2013.01) |
| *G06F 21/55* | (2013.01) |
| *G06F 16/958* | (2019.01) |
| *G06F 9/54* | (2006.01) |
| *G06F 16/955* | (2019.01) |
| *H04L 12/58* | (2006.01) |

(52) U.S. Cl.
CPC .......... *G06F 21/6245* (2013.01); *G06F 9/542* (2013.01); *G06F 16/955* (2019.01); *G06F 16/958* (2019.01); *G06F 21/554* (2013.01); *G06F 21/556* (2013.01); *H04L 51/12* (2013.01)

(58) Field of Classification Search
CPC ............. G06F 21/6245; G06F 21/6227; G06F 21/6263; G06F 16/955; G06F 16/958; G06F 9/542; G06F 21/554; G06F 21/556; H04L 51/12; H04L 9/0866; H04L 9/0877
See application file for complete search history.

(56) References Cited

U.S. PATENT DOCUMENTS

| | | | |
|---|---|---|---|
| 9,973,525 B1 | 5/2018 | Roturier et al. | |
| 10,699,028 B1* | 6/2020 | Kennedy | G06F 16/2462 |
| 10,783,275 B1* | 9/2020 | Nichols | H04L 63/00 |
| 2007/0192247 A1* | 8/2007 | West | G06Q 20/108 |
| | | | 705/42 |
| 2013/0340089 A1* | 12/2013 | Steinberg | H04L 51/12 |
| | | | 726/27 |
| 2014/0007255 A1* | 1/2014 | Altaf | H04L 63/0407 |
| | | | 726/27 |

OTHER PUBLICATIONS

Reviews for Security Awareness Computer-Based Training, <https://www.gartner.com/reviews/market/security-awareness-computer-based-training>, Dec. 7, 2018, 4 pages.

* cited by examiner

*Primary Examiner* — Yogesh Paliwal
(74) *Attorney, Agent, or Firm* — FisherBroyles, LLP

(57) ABSTRACT

Methods and systems are provided for monitoring private information exposure. One example method generally includes detecting, at a computing device, a potentially exposing post on a publicly-accessible server and determining, by an exposure model operated by the computing device, an exposure chance for the potentially exposing post. The method further includes transmitting an initial notification of the potentially exposing post from the computing device to a client device based on the exposure chance from the exposure model and detecting an update event associated with the potentially exposing post. The method further includes updating the exposure model based on the update event and transmitting a personalized notification from the computing device to the client device based on the update event.

20 Claims, 6 Drawing Sheets

US 11,194,925 B1

USER-BASED CYBER RISK COMMUNICATIONS USING PERSONALIZED NOTIFICATIONS

BACKGROUND

Field

Embodiments of the present invention generally relate to detecting and notifying users of exposures of private information.

Description of the Related Art

When using networked computing applications, it is possible for private, information about a user (or the user's organization) to be inadvertently shared or otherwise made publicly available. For example, a user may send an invitation via email to an event, including a list of attendees. With some invitation services, a publicly-viewable copy of the invitation may be made available, making information about the attendees (specifically where they will be at the time of the event) available to the public. Such leaks can particularly be an issue for organizations, where individuals may not realize what kinds of information about the organization are appropriate to be released.

Existing methods of preventing exposures of information, such as data loss prevention (DLP) software or digital risk monitoring services, tend to rely on user-provided lists or categories of sensitive information that should not be leaked. However, this action itself is inherently non-private as users must reveal their private information to the service provider. Further, even when given such information, service providers may be unable to detect all possible permutations of a particular type of sensitive information, as existing methods have no feedback systems to improve the quality of detecting information exposures. Thus, systems and methods are needed to detect and alert users of exposed information without requiring sensitive information from the users.

SUMMARY

One embodiment of the present disclosure provides a method for monitoring private information exposure, at least a portion of the method being performed by a computing device comprising one or more processors. The method generally involves detecting, at the computing device, a potentially exposing post on a publicly-accessible server and determining, by an exposure model operated by the computing device, an exposure chance for the potentially exposing post. The method further involves transmitting an initial notification of the potentially exposing post from the computing device to a client device based on the exposure chance from the exposure model and detecting an update event associated with the potentially exposing post. The method further involves updating the exposure model based on the update event and transmitting a personalized notification from the computing device to the client device based on the update event.

Another embodiment is a computing device. The computing device includes at least one processor and a memory coupled to the processor. The memory has instructions stored thereon which, when executed by the processor, perform operations for monitoring private information exposure. The operations generally involve detecting, at a computing device, a potentially exposing post on a publicly-accessible server and determining, by an exposure model operated by the computing device, an exposure chance for the potentially exposing post. The operations further involve transmitting an initial notification of the potentially exposing post from the computing device to a client device based on the exposure chance from the exposure model and detecting an update event associated with the potentially exposing post. The operations further involve updating the exposure model based on the update event and transmitting a personalized notification from the computing device to the client device based on the update event.

Still another embodiment is a non-transitory computer-readable medium having instructions stored thereon which, when executed by at least one processor of a computing device, perform operations monitoring private information exposure. The operations generally involve detecting, at the computing device, a potentially exposing post on a publicly-accessible server and determining, by an exposure model operated by the computing device, an exposure chance for the potentially exposing post. The operations further involve transmitting an initial notification of the potentially exposing post from the computing device to a client device based on the exposure chance from the exposure model and detecting an update event associated with the potentially exposing post. The operations further involve updating the exposure model based on the update event and transmitting a personalized notification from the computing device to the client device based on the update event.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
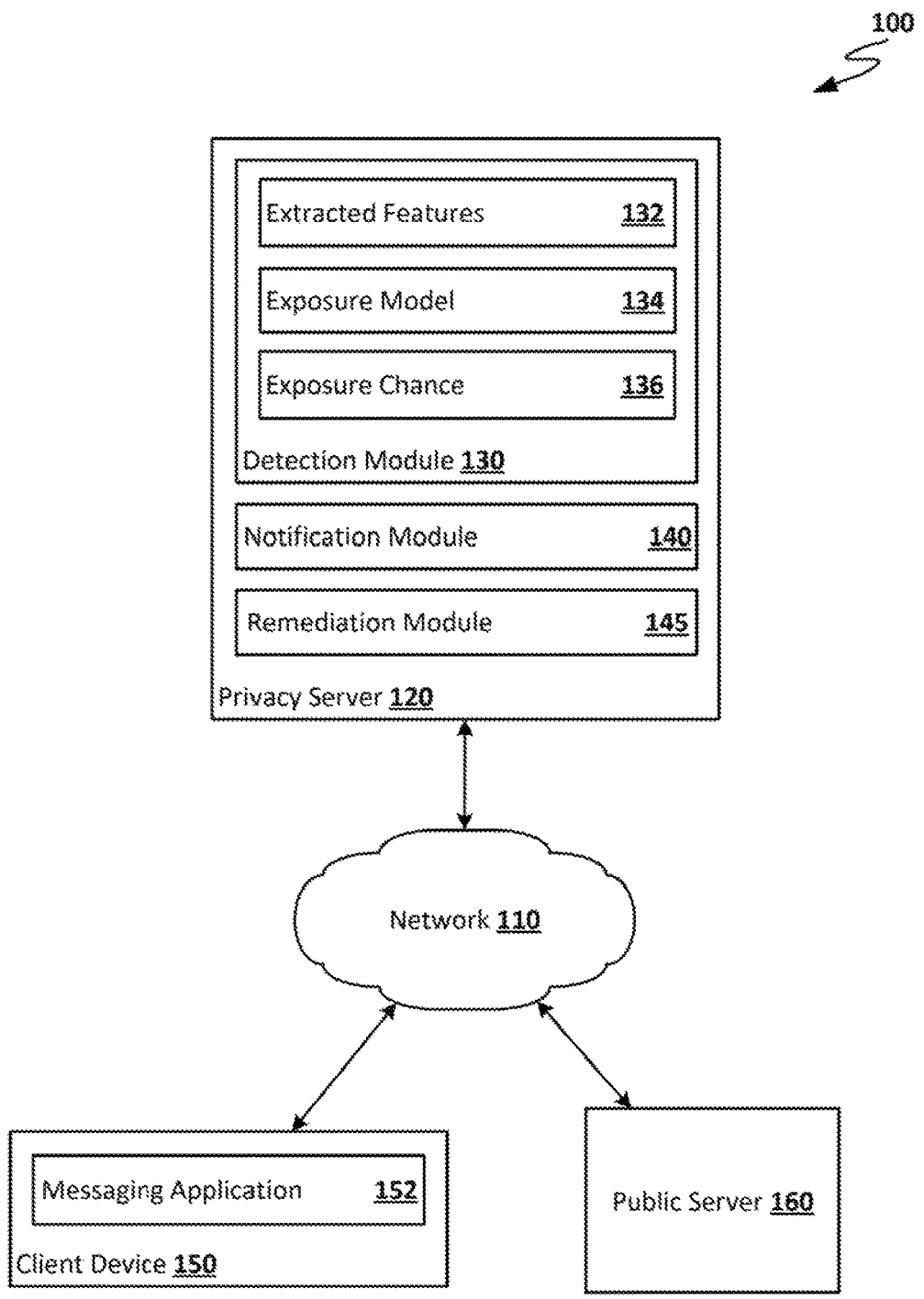
FIG. 1 is a block diagram of an example computing environment in which systems of the present disclosure may operate, according to an embodiment of the present disclosure.

In order to prevent the exposure of private information, an exposure service executing on a privacy server may be used.

Private information may include various identifying information for individuals or entities, or entity of interest (EoI) information. EoI information that should not be shared may be called sensitive EoI. The exposure service may monitor various publicly-viewable information sources to identify posts that include potentially exposing material (such as sensitive EoI), and may send notifications through various channels when a potentially exposing post is found. To do so, the exposure service may make use of a machine learning exposure model (also referred to as an "exposure detection model") to parse and identify potentially exposing text and other information in the publicly-viewable information.

The exposure service generally identifies a potentially exposing post and transmits a notification of the potentially exposing post to a client device. As used herein, the term "post" generally refers to any of various suitable types of information that may be available via a publicly-viewable server. For example, a post may be a document, a web page, a section of text, an image, a combination of those items, or additional publicly-viewable items.

After identifying the potentially exposing post, in addition to continuing to monitor additional posts, the exposure service may repeatedly check (e.g., periodically or intermittently) the potentially exposing post for changes. The exposure service may use such changes to determine if the initial assessment of the potentially exposing post was correct. For example, if the potentially exposing post has been removed, the exposure service may take such removal as a confirmation of information exposure. The exposure service may pass this confirmation to the exposure model and re-train the exposure model in order to improve subsequent detection of information exposure. Additionally, the exposure service may perform various remedial actions when a potentially exposing post is detected, to limit further information exposure.

By casting a relatively wide net initially (e.g., by flagging many kinds of information as exposures), the exposure model can determine which types of information are important to a user (or an organization) by responding to changes made by the user to potentially exposing posts, and thus improving analysis of similar posts. By so determining which types of information are important, the exposure service can fully implement detecting exposures of private information without first asking the user (or the organization) to provide a list of sensitive information to monitor for. The exposure service may also use such knowledge to communicate the risks of sharing information to users, to prevent future exposures of information.

Existing methods of detecting private information exposure rely on users providing types of private information or even specific examples of private information, which is inherently unsecure as the user must provide the sensitive information to a service provider, at least. Further, existing methods are unable to use user responses to notifications to confirm an analysis of information, and thus typically cannot improve performance over time.

FIG. 1 is a block diagram of an example computing environment 100 in which systems of the present disclosure may operate, according to an embodiment of the present disclosure. Computing environment 100 includes privacy server 120, client device 150, and public server 160, connected via network 110 (e.g., the Internet).

Privacy server 120 is a computing device (e.g., within a cloud computing system) including at least a processor, memory, and a network interface. Privacy server 120 includes detection module 130, notification module 140, and remediation module 145. Detection module 130, notification module 140, and remediation module 145 constitute an exposure service executing on privacy server 120, which is capable of detecting and notifying a user of exposures of information.

Detection module 130 is a software routine executing on privacy server 120 to detect potentially exposing posts that are available on publicly-viewable sources, such as public server 160. For example, if public server 160 is a web server, potentially exposing posts may be web pages associated with a uniform resource locator (URL) and a hypertext markup language (HTML) document. Detection module 130 stores extracted features 132, which are features extracted from a post available on public server 160, such as metadata associated with a post (e.g., a robots.txt directive associated with a URL), character n-grams from a URL, or text taken from an HTML document.

Detection module 130 includes exposure model 134, which is a machine learning model trained to assess the likely security risk of a post based on features extracted from the post. In this example, exposure model 134 executes on privacy server 120, but in other examples exposure model 134 may be trained or executed on a separate computing device or server. Exposure model 134 accepts extracted features 132 as input, and outputs exposure chance 136. Exposure model 134 includes various parameters that are used to alter the analysis of different kinds of information that may be considered private by some users (or organizations), but non-private by others. For example, some users (or organizations) may consider email addresses to be private information that should not be shared, while others may consider email addresses acceptable to be shared. The parameters of exposure model 134 can be adapted for different users to account for differences in information security between those users.

The output of exposure model 134 is exposure chance 136, a rating of the likelihood of private information exposure based on a potentially exposing post. In general, if exposure chance 136 exceeds a notification threshold, the exposure service uses notification module 140 to generate and transmit a notification based on exposure chance 136.

Notification module 140 is a software routine executing on privacy server 120, used to generate and transmit notifications of potentially exposing posts to client devices, such as client device 150. Notification module 140 is used to transmit two types of notifications, first (or initial) notifications alerting a user (or organization) of a potentially exposing post, and personalized notifications intended to communicate the risk of sharing information and prevent future information exposures.

Remediation module 145 is a software routine executing on privacy server 120, used to perform various remediation actions after detection of a potentially exposing post by detection module 130. For example, remediation module 145 may, in some examples, transmit a request to an administrator of public server 160 to remove a potentially exposing post from public server 160, or to redact private information of the potentially exposing post. Remediation module 145 may also change access to a potentially exposing post, generate and send alerts to users associated with accounts affected by a potentially exposing post, deny access to the potentially exposing post, or generate a request to disable a URL associated with the potentially exposing post.

Client device 150 is a computing device operated by a user of the exposure service. In this example a single client device is shown; however, in other examples the exposure service may transmit notifications to a plurality of different computing devices, including personal user devices, organizational servers, or other administrative computing devices. Client device 150 includes messaging application 152, a software routine executing on client device 150. Messaging application 152 may be a variety of different software applications capable of sending and receiving messages, such as an email client or a web browser. In some examples messaging application 152 may be a dedicated client process of the exposure service, such as a standalone application or a web browser plug-in.

Public server 160 is a publicly-accessible computing device such as a web server. A single public server is shown in this example, however, in other examples a plurality of publicly-accessible servers may be monitored by detection module 130. Public server 160 hosts various publicly-viewable documents, such as HTML web pages or other networked documents. In this example, public server 160 hosts a potentially exposing post analyzed by the exposure service.

In general, the exposure service, specifically detection module 130, monitors public server 160 for potentially exposing posts. In some examples, such monitoring may involve monitoring one or more additional publicly-accessible servers hosting a link or links to public server 160 (or other public servers). Potentially exposing posts may be inadvertently made by a user of client device 150, such as by sending an insecure invitation to a meeting via email through the network 110. Detection module 130 regularly monitors public server 160 to identify potentially exposing posts. To do so, detection module 130 extracts features of posts to public server 160 (shown as extracted features 132) and passes those extracted features to exposure model 134 as input.

Exposure model 134 performs content analysis on the potentially exposing post by using extracted features to determine if the post includes private information. If so, exposure model 134 generates a relatively high exposure chance 136. Based on exposure chance 136, notification module 140 generates and transmits an initial notification to client device 150, informing the user of client device 150 of the potentially exposing post.

Thereafter, detection module 130 repeatedly (e.g., periodically, such as hourly or daily) checks the potentially exposing post for changes. For example, the user may respond to the initial notification by removing the potentially exposing post or altering the potentially exposing post to not include the private information. Such changes are identified by detection module 130, and used to update exposure model 134. That is, a response to a notification resulting in removal is interpreted by detection module 130 as a confirmation of exposure. Conversely, if the user does not make a change after a given period of time, detection module 130 may take such inaction as an indication that there was no exposure, and modify parameters of exposure model 134 appropriately. Collectively, changes to the potentially exposing post and determinations of no change by the exposure service may be referred to as "update events" associated with the potentially exposing post.

After detecting an update event, notification module 140 may then generate and transmit a personalized notification to the client device 150 via the network 110, intended for the user of client device 150. Such a personalized notification may include information such as what kind of information was exposed in the post, why such information should not be shared (e.g., the risks associated with sharing such information), and/or advice or guidance on how future exposures of such information may be avoided. In other examples the personalized notification may be prepared and sent concurrently with or as part of the initial notification. In still other examples the personalized notification may be presented to subsequent visitors of the URL associated with the post after the initial notification is sent, but before a change in the post is detected. When generating the personalized notification, the exposure service may determine whether any Security Awareness Training (SAT) may be implemented to prevent subsequent exposures, such as if sensitive information is repeatedly exposed by the same account (or the same user).

Figure 2:
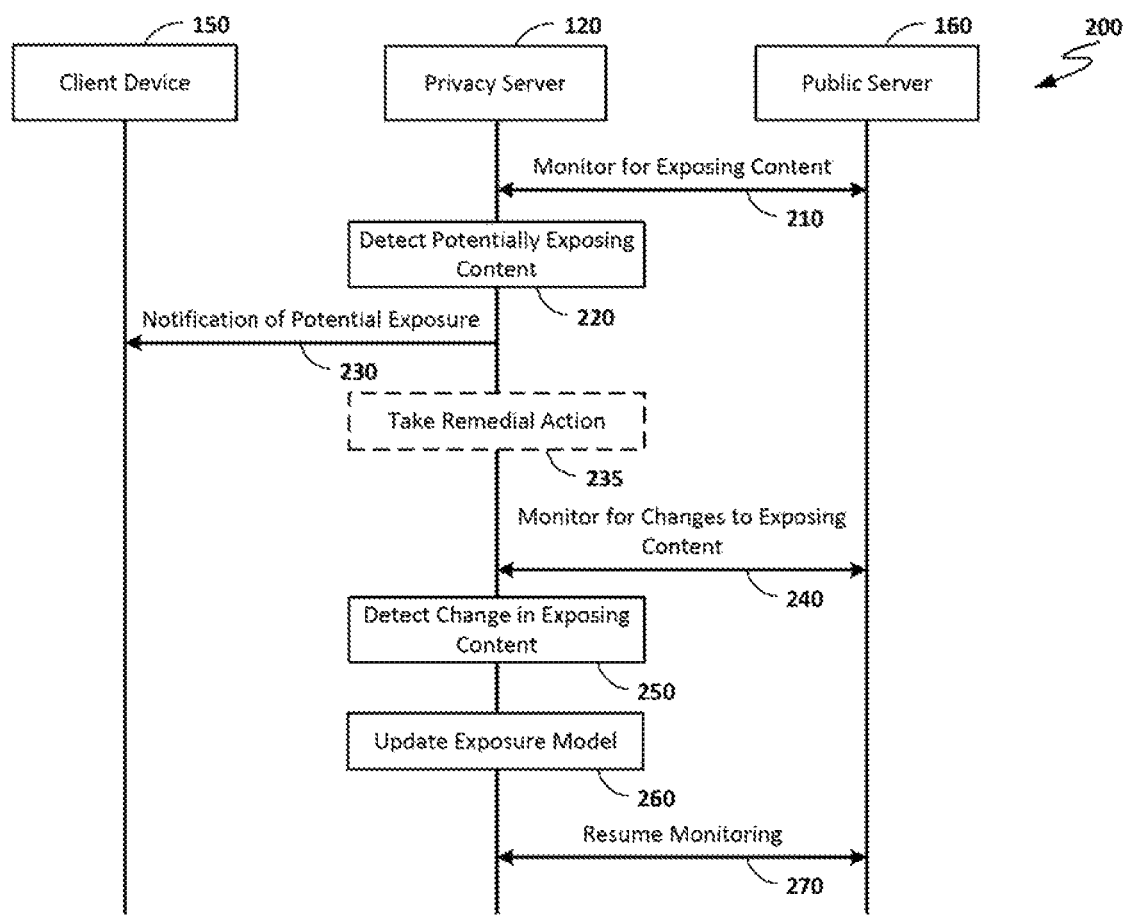
FIG. 2 is a call flow diagram of an example method for sending notifications of private information exposure, according to an embodiment of the present disclosure.

FIG. 2 is a call flow diagram of an example method 200 for sending notifications of private information exposure, according to an embodiment of the present disclosure. Method 200 involves privacy server 120, client device 150, and public server 160. Method 200 begins at 210, where privacy server 120 monitors posts to public server 160 for potentially exposing information. In this example, as in FIG. 1, only a single public server is shown. However, in practice privacy server 120 may monitor a plurality of public servers in order to detect all, or at least multiple, possible information exposures.

At 220, privacy server 120 detects potentially exposing content available on public server 160 (e.g., in a post). Privacy server 120 detects potentially exposing content by extracting features from content available on public server 160 and passing those extracted features to an exposure model, such as exposure model 134 of FIG. 1. If output from the exposure model indicates that the content potentially exposes private information, privacy server 120, at 230, transmits an initial notification to client device 150 of the potentially exposing content.

After transmitting the notification, in some embodiments as shown at 235, privacy server 120 takes remedial action based on the detection of the potentially exposing content. For example, the privacy server may in some cases contact an administrator of public server 160 requesting removal, or may contact user(s) associated with account(s) affected by the information exposure. Another remedial action may include performing a lockdown of account(s) associated with the information exposure.

At 240, privacy server 120 monitors public server 160 for changes to the potentially exposing content. For example, if the potentially exposing content is associated with a URL and an HTML file, privacy server 120 repeatedly (e.g., periodically) accesses the URL and compares the original HTML file with what is currently accessed to determine if any changes have been made (the post has been changed), or if the URL has been disassociated with any HTML file (the post has been removed).

At 250, privacy server 120 detects a change in the potentially exposing content. In general, a redaction of information in the potentially exposing post by the user (including complete removal of the post) may be considered as a confirmation of information exposure. In other examples, a failure to change or remove the potentially exposing post by the user may indicate that the detection of information exposure was a false positive. In either event, at 260, privacy server 120 updates the exposure model to refine subsequent exposure detection. For example, a confirmation of information exposure may lead to updating the exposure model to more frequently flag similar types of information as were exposed, while a false positive may lead to updating the exposure model to less frequently flag similar types of information.

Privacy server 120 may also determine the length of time between the initial notification at 230 and the change to the potentially exposing content. For example, a relatively quick response by the user may indicate that the information exposed is highly important, and the exposure model should be updated to accord similar information higher importance.

At 270, privacy server 120 resumes monitoring of public server 160 for additional information exposures, using the exposure model as updated at 260. In general, the monitoring resumed at 270 may be more attuned to the user's actual privacy needs and/or preferences than the monitoring initially performed at 210. By continually updating the exposure model by iterative uses of method 200, the exposure model may be well adapted to the user's privacy needs over time, providing more personalized and accurate exposure detection over time.

Figure 3:
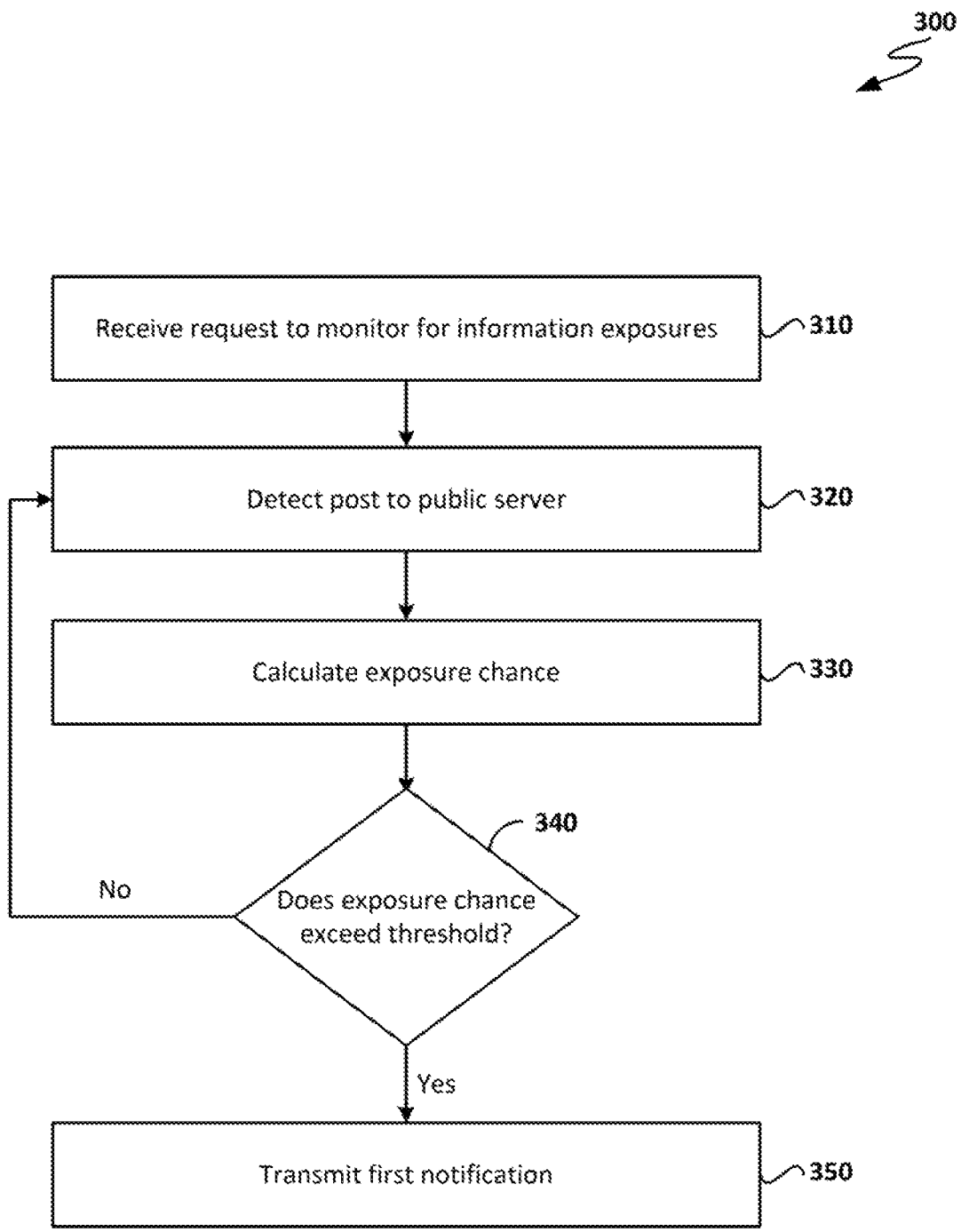
FIG. 3 is a flow diagram of an example method for detecting and transmitting a notification of a potentially exposing post, according to an embodiment of the present disclosure.

FIG. 3 is a flow diagram of an example method 300 for detecting and transmitting a notification of a potentially exposing post, according to an embodiment of the present disclosure. Method 300 may be performed by an exposure service executing on a privacy server, such as privacy server 120 of FIG. 1.

Method 300 begins at 310, where the exposure service receives a request to monitor for information exposures of a particular entity. The entity may be an individual user or an organization, such as a company. The entity may also be an individual within the organization, (e.g., a new employee of a company). Monitoring may involve use of a machine learning exposure model by the exposure service, such as exposure model 134 of FIG. 1. When beginning monitoring for a new entity, the exposure model used may be uninitialized, in the sense that the exposure model is not refined to account for the entity's particular information exposure preferences.

At 320, the exposure service detects a post to a publicly-available server, such as a web server. The exposure service may perform monitoring by analyzing communications to and from the entity, such as emails, for the inclusion of publicly available content such as URLs to web pages. The exposure service may also perform monitoring by making use of a list of servers that frequently host private information. The exposure service may also perform monitoring by making use of URL or web scanning services (such as urlscan.io) or by use of search engines.

At 330, the exposure service, via the exposure model, calculates an exposure chance for the post. In general, the exposure service passes features extracted from the post as input to an exposure model, and the calculation at 330 is the output of the exposure model. The exposure chance is an estimation that the post includes an exposure of private information. To that end, the presence of some features of the post (such as names, email addresses, other personally identifiable information (PII), or strings such as "internal use only" or "Log out") may increase the overall exposure chance, while the absence of some features may decrease the overall exposure chance.

At 340, the exposure service determines if the exposure chance exceeds an exposure threshold. For example, if the exposure chance is scaled from 0 to 1, an exposure threshold may be a value such as 0.2, meaning an exposure chance of only 20% is enough to notify the entity of potential exposure. In other cases the exposure threshold may be lower or higher. If the exposure threshold is not exceeded, method 300 returns to 320, and monitoring is resumed until a next post is detected. If the exposure threshold is exceeded, method 300 proceeds to 350.

At 350, the exposure service transmits an initial notification (e.g., via email) to a computing device associated with the entity. The notification is intended to alert the entity to the potential information exposure of the post. The initial notification may include various artifacts related to the post, including a screenshot of an HTML file associated with the post or a URL associated with the post. After transmitting the initial notification, the exposure service may resume monitoring for other potentially exposing posts, but also continues to monitor the post detected at 320, as discussed below with respect to FIG. 4.

Figure 4:
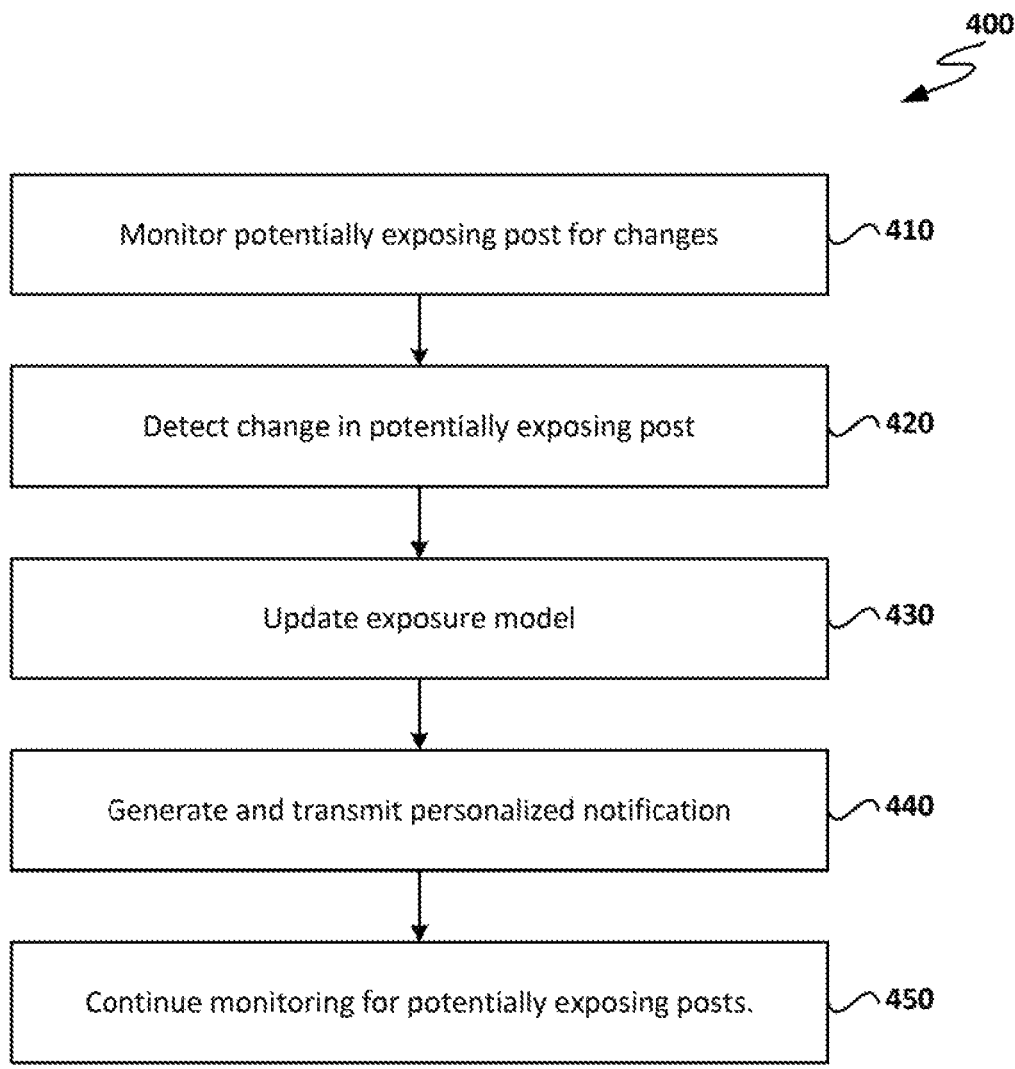
FIG. 4 is a flow diagram of an example method for determining and transmitting a personalized notification, according to an embodiment of the present disclosure.

FIG. 4 is a flow diagram of an example method 400 for determining and transmitting a personalized notification, according to an embodiment of the present disclosure. Method 400 may be performed by an exposure service executing on a privacy server, such as privacy server 120 of FIG. 1. For some embodiments, method 400 may be a continuation of method 300 of FIG. 3.

Method 400 begins at 410, where the exposure service monitors a previously-identified potentially exposing post for changes to the potentially exposing post. This monitoring is repetitive (e.g., periodic, such as hourly or daily). While performing this monitoring the exposure service keeps track of the total amount of time expired since an initial notification was sent to an entity with respect to the potentially exposing post and a detected change.

At 420, the exposure service detects a change in the potentially exposing post. For example, an HTML file associated with the potentially exposing post may have been altered or removed, or access to the post may have been revoked from the public. In other examples, a time threshold for changes may be exceeded before a change is detected, in which case the exposure service may determine the potentially exposing post was a false positive for information exposure.

At 430, the exposure service updates the exposure model based on the change detected at 420. Removals or redactions of potentially exposing posts may be interpreted as confirmation of information exposure, while failures to remove may be interpreted as false positives of information exposure. In general, a confirmation or false positive may be more indicative of the entity's security preferences than the absence or presence of private information. An update to the exposure model improves subsequent use of the exposure model to detect information exposures, by refining the exposure model to better reflect the entity's security preferences. The update may take into account both the change made and the length of time between transmitting the initial notification and the change being made.

At 440 the exposure service generates and transmits a personalized notification to the entity. The personalized notification can include information such as a notice of what information was shared, why it should not have been shared, and ways to prevent future information exposures. In some embodiments, the personalized notification may be prepared and transmitted with the initial notification or as part of the initial notification. In still other embodiments, a client application of the exposure service, such as a browser plug-in for a web browser, may display the personalized notification to visitors of a URL associated with the potentially exposing post. At 450, the exposure service continues monitoring for other potentially exposing posts of the entity.

Figure 5:
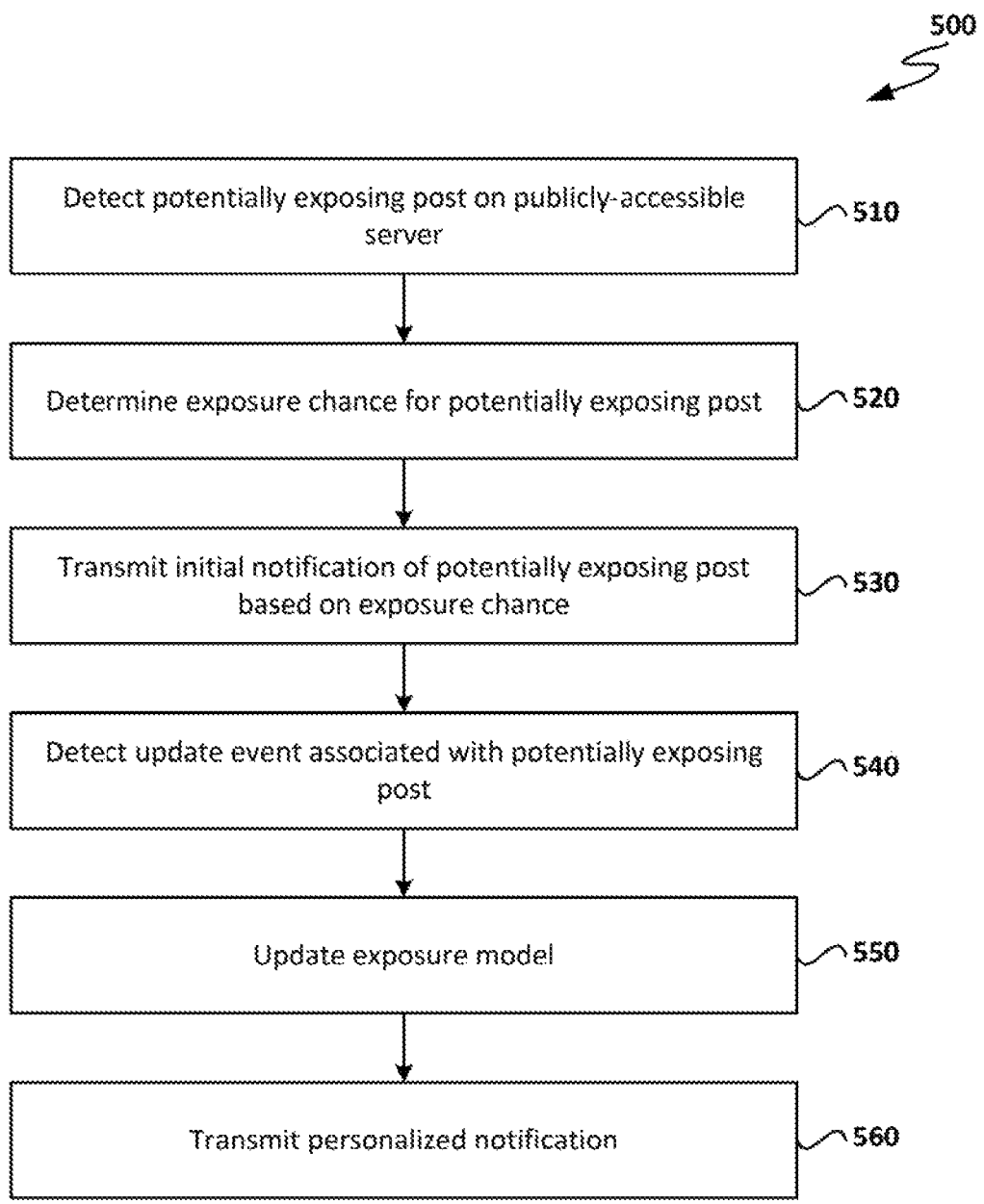
FIG. 5 is a flow diagram of an example method for monitoring private information exposure, according to an embodiment of the present disclosure.

FIG. 5 is a flow diagram of an example method 500 for monitoring private information exposure, according to an embodiment of the present disclosure. Method 500 may be performed by an exposure service executing on a privacy server, such as privacy server 120 of FIG. 1.

Method 500 begins at 510, where the exposure service detects a potentially exposing post available on a publicly-accessible server. The exposure service detects such a post in the course of monitoring for private information exposure on behalf of an entity, such as an individual user or an organizational entity.

At 520, the exposure service determines an exposure chance for the potentially exposing post using output from an exposure model (e.g., an exposure detection model, which may be based on machine learning and implemented by an artificial neural network). More specifically, the exposure model takes features extracted from the post, such as text, character n-grams, or metadata, to calculate an exposure chance for the post. If the exposure chance exceeds a threshold, the exposure service determines that the post is potentially exposing, and thus triggers a notification to the entity.

At 530, the exposure service transmits an initial notification of the potentially exposing post to a client device associated with the entity. If the entity is an individual user, the client device may be a personal computing device such as a desktop computer, laptop computer, or a mobile device equipped with a client application of the exposure service. If the entity is an organization, the client device may be a mail server or other communication device of the organization. In either event the notification may take a variety of forms, such as an email, a push notification on a smartphone, or application data of a dedicated security application on the client device.

At 540, the exposure service detects an update event associated with the potentially exposing post. An update event may include a change to the potentially exposing post, such as complete removal or a redaction of certain information. An update event may also be a determination of no change by the exposure service, based on a time limit for changes being exceeded. In general, if the update event is a change to the potentially exposing post, the change may be made by the entity in response to the initial notification. That is, if the entity determines that the potentially exposing post is indeed an information exposure, the entity may respond by removing the post or altering the post so as to no longer include private information.

At 550, the exposure service updates the exposure model based on the update event associated with the potentially exposing post. Removals or alterations of the potentially exposing post indicate a confirmation of information exposure, which can be used to change the way the exposure model analyzes subsequent potentially exposing posts, such as by more heavily weighting similar types of information (or similar features to the features used as input to the exposure model).

At 560 the exposure service transmits a personalized notification to the client device based on the update event. The exposure service generates the personalized notification based not only on the initially gathered information of the post, but also the update event in the post, and possibly the time between the initial notification and the change in the post, if the update event is a change. For example, if a post is rapidly removed, the personalized notification may include a report of this rapid removal. In other examples, the notification may be sent to a device other than the client device. For example, if the initial notification is sent to an organization entity, the personalized notification may be sent to an individual user.

Figure 6:
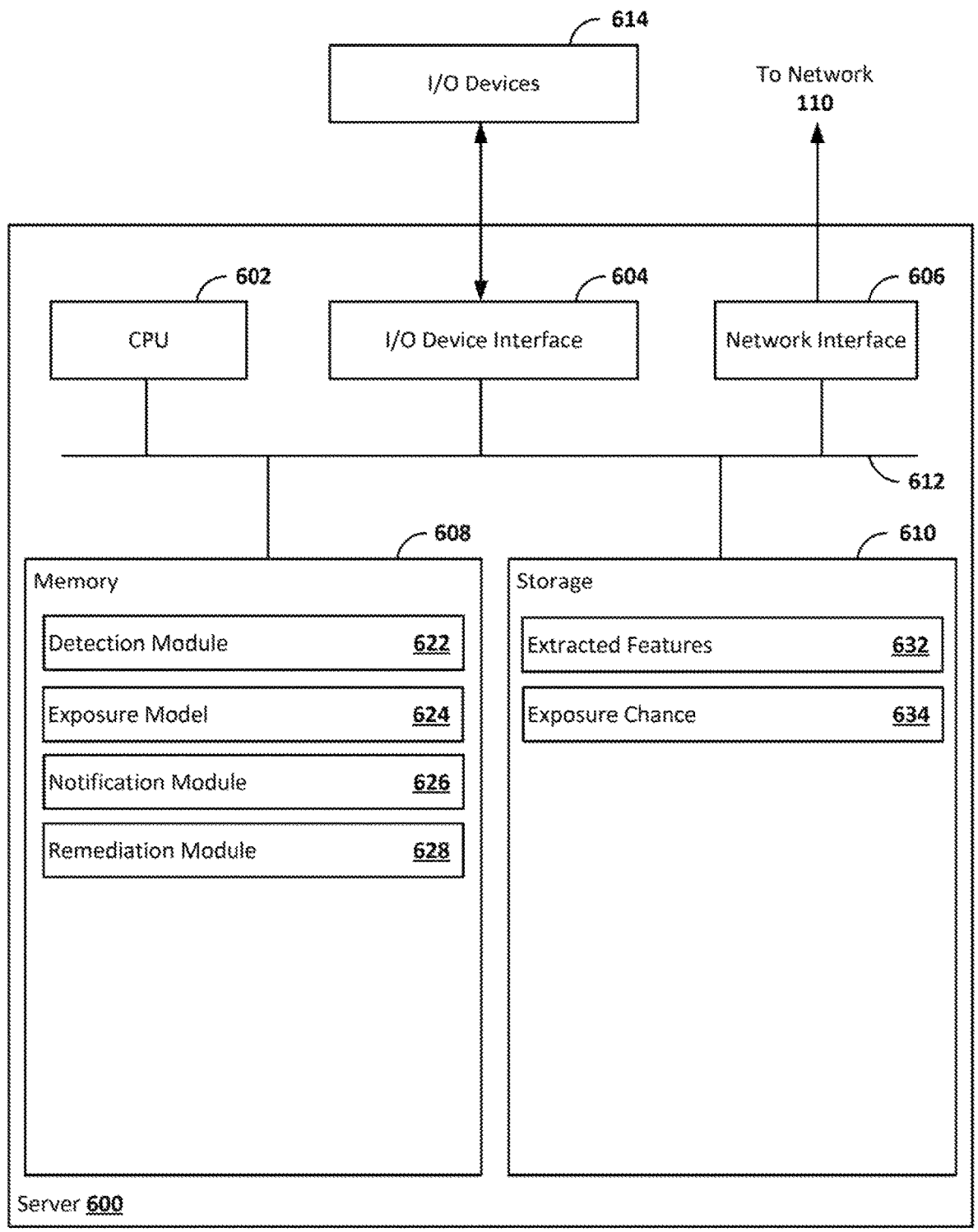
FIG. 6 is a block diagram of an example privacy server, according to an embodiment of the present disclosure.

FIG. 6 is a block diagram of an example privacy server 600, according to an embodiment of the present disclosure. As shown, privacy server 600 includes, without limitation, a central processing unit (CPU) 602, one or more input/output (I/O) device interfaces 604, which may allow for the connection of various I/O devices 614 (e.g., keyboards, displays, mouse devices, pen input, etc.) to the privacy server 600, network interface 606, memory 608, storage 610, and an interconnect 612.

The CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. The CPU 602 is included to be representative of a single CPU, multiple CPUs, a single CPU having multiple processing cores, and the like. The I/O device interface 604 may provide an interface for capturing data from one or more input devices integrated into or connected to the privacy server 600, such as keyboards, mice, touchscreens, and so on. The memory 608 may represent a random access memory (RAM), while the storage 610 may be a solid state drive, for example. Although shown as a single unit, the storage 610 may be a combination of fixed and/or removable storage devices, such as fixed drives, removable memory cards, network attached storage (NAS), or cloud-based storage.

As shown, the memory 608 includes detection module 622, exposure model 624, notification module 626, and remediation module 628. Detection module 622, exposure model 624, notification module 626, and remediation module 628 are software routines executed based on instructions stored in the storage 610. Such instructions may be executed by the CPU 602.

As shown, the storage 610 includes extracted features 632 and exposure chance 634. In general, detection module 622 detects, via network interface 606, a potentially exposing post on a public server. Detection module 622 then extracts features from the potentially exposing post to generate extracted features 632. Extracted features 632 are then passed to exposure model 624 as input, which outputs exposure chance 634. Based on exposure chance 634, notification module 626 may transmit an initial notification to a client device via network interface 606. Also based on exposure chance 634, remediation module 628 may perform remediation actions via network interface 606. After transmitting the initial notification, detection module 622 may detect changes to the potentially exposing post and update exposure model 624 accordingly.

One embodiment of the present disclosure provides a method for monitoring private information exposure. The method generally includes detecting, at a computing device, a potentially exposing post on a publicly-accessible server; determining, by an exposure model operated by the computing device, an exposure chance for the potentially exposing post; transmitting an initial notification of the potentially exposing post from the computing device to a client device based on the exposure chance from the exposure model; detecting an update event associated with the potentially exposing post; updating the exposure model based on the update event; and transmitting a personalized notification from the computing device to the client device based on the update event.

According to some embodiments, the method further involves taking a remedial action based on the potentially exposing post.

In some embodiments of the method, the personalized notification includes at least one of: information of what information is shared by the potentially exposing post; an explanation of why the information should not be shared; or advice relating to preventing subsequent exposures of the information.

In some embodiments of the method, the initial notification includes a screenshot of the potentially exposing post.

According to some embodiments, the method further involves after transmitting the initial notification, periodically accessing the potentially exposing post.

In some embodiments of the method, the update event includes one of: a removal of the potentially exposing post from the publicly-accessible server; or an alteration of the potentially exposing post to remove information from the potentially exposing post.

In some embodiments of the method, updating the exposure model comprises: determining a length of time between transmitting the initial notification and detecting a change in the potentially exposing post; and modifying parameters of the exposure model based on the length of time.

According to some embodiments, detecting the update event comprises: determining, after a time limit for changes to the potentially exposing post has been exceeded, that a false positive was detected; and updating the exposure model based on the false positive.

In some embodiments of the method, an identification of private information is not requested from the client device.

In some embodiments of the method, the potentially exposing post is associated with a uniform resource locator (URL). In this case, the method may further entail transmitting the personalized notification to one or more other computing devices subsequently accessing the URL.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim. Likewise, reference to "the invention" shall not be construed as a generalization of any inventive subject matter disclosed herein and shall not be considered to be an element or limitation of the appended claims except where explicitly recited in a claim.

Aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer-readable media having computer-readable program code embodied thereon.

Any combination of one or more computer-readable media may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples of a computer-readable storage medium include: an electrical connection having one or more wires, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the current context, a computer-readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for monitoring private information exposure, at least a portion of the method being performed by a computing device comprising one or more processors, the method comprising:
  detecting, at the computing device, a potentially exposing post on a publicly-accessible server;
  determining, by an exposure model operated by the computing device, an exposure chance for the potentially exposing post;
  transmitting an initial notification of the potentially exposing post from the computing device to a client device based on the exposure chance from the exposure model;
  detecting an update event associated with the potentially exposing post;
  updating the exposure model based on the update event, the updating comprising:
    determining a length of time between transmitting the initial notification and detecting a change in the potentially exposing post; and
    modifying parameters of the exposure model based on the length of time; and
  transmitting a personalized notification from the computing device to the client device based on the update event.

2. The computer-implemented method of claim 1, further comprising taking a remedial action based on the potentially exposing post.

3. The computer-implemented method of claim 1, wherein the personalized notification includes at least one of:
  information of what information is shared by the potentially exposing post;
  an explanation of why the information should not be shared; or
  advice relating to preventing subsequent exposures of the information.

4. The computer-implemented method of claim 1, wherein the initial notification includes a screenshot of the potentially exposing post.

5. The computer-implemented method of claim 1, further comprising, after transmitting the initial notification, periodically accessing the potentially exposing post.

6. The computer-implemented method of claim 1, wherein the update event includes one of:
   a removal of the potentially exposing post from the publicly-accessible server; or
   an alteration of the potentially exposing post to remove information from the potentially exposing post.

7. The computer-implemented method of claim 1, wherein detecting the update event comprises:
   determining, after a time limit for changes to the potentially exposing post has been exceeded, that a false positive was detected; and
   updating the exposure model based on the false positive.

8. The computer-implemented method of claim 1, wherein an identification of private information is not requested from the client device.

9. The computer-implemented method of claim 1, wherein the potentially exposing post is associated with a uniform resource locator (URL), and wherein the method further comprises transmitting the personalized notification to one or more other computing devices subsequently accessing the URL.

10. A computing device comprising:
    at least one processor; and
    a memory having instructions stored thereon which, when executed by the processor, perform operations for monitoring private information exposure, the operations comprising:
       detecting, at the computing device, a potentially exposing post on a publicly-accessible server;
       determining, by an exposure model operated by the computing device, an exposure chance for the potentially exposing post;
       transmitting an initial notification of the potentially exposing post from the computing device to a client device based on the exposure chance from the exposure model;
       detecting an update event associated with the potentially exposing post, the detecting comprising determining, after a time limit for changes to the potentially exposing post has been exceeded, that a false positive was detected;
       updating the exposure model based on the update event being a false positive; and
       transmitting a personalized notification from the computing device to the client device based on the update event.

11. The computing device of claim 10, the operations further comprising taking a remedial action based on the potentially exposing post.

12. The computing device of claim 10, wherein the personalized notification includes at least one of:
    information of what information is shared by the potentially exposing post; an explanation of why the information should not be shared; or
    advice relating to preventing subsequent exposures of the information.

13. The computing device of claim 10, wherein the initial notification includes a screenshot of the potentially exposing post.

14. The computing device of claim 10, the operations further comprising, after transmitting the initial notification, periodically accessing the potentially exposing post.

15. The computing device of claim 10, wherein the update event includes one of: a removal of the potentially exposing post from the publicly-accessible server;
    or
    an alteration of the potentially exposing post to remove information from the potentially exposing post.

16. The computing device of claim 10, wherein updating the exposure model comprises:
    determining a length of time between transmitting the initial notification and detecting a change in the potentially exposing post; and
    modifying parameters of the exposure model based on the length of time.

17. The computing device of claim 10, wherein the potentially exposing post is associated with a uniform resource locator (URL), and wherein the operations further comprise transmitting the personalized notification to one or more other computing devices subsequently accessing the URL.

18. A non-transitory computer-readable medium having instructions stored thereon which, when executed by at least one processor of a computing device, perform operations for monitoring private information exposure, the operations comprising:
    detecting, at the computing device, a potentially exposing post on a publicly-accessible server;
    determining, by an exposure model operated by the computing device, an exposure chance for the potentially exposing post;
    transmitting an initial notification of the potentially exposing post from the computing device to a client device based on the exposure chance from the exposure model;
    detecting an update event associated with the potentially exposing post;
    updating the exposure model based on the update event, the updating comprising:
       determining a length of time between transmitting the initial notification and detecting a change in the potentially exposing post; and
       modifying parameters of the exposure model based on the length of time; and
    transmitting a personalized notification from the computing device to the client device based on the update event.

19. The non-transitory computer-readable medium of claim 18, wherein the operations further comprise taking a remedial action based on the potentially exposing post.

20. The non-transitory computer-readable medium of claim 18, wherein the personalized notification includes at least one of:
    information of what information is shared by the potentially exposing post;
    an explanation of why the information should not be shared; or
    advice relating to preventing subsequent exposures of the information.

* * * * *

UNITED STATES PATENT AND TRADEMARK OFFICE
CERTIFICATE OF CORRECTION

PATENT NO. : 11,194,925 B1
APPLICATION NO. : 16/224358
DATED : December 7, 2021
INVENTOR(S) : Johann Roturier et al.

It is certified that error appears in the above-identified patent and that said Letters Patent is hereby corrected as shown below:

On the Title Page

Item (73), in Column 1, in "Assignee", Line 1, delete "inc.," and insert -- Inc., --.

Signed and Sealed this
Second Day of August, 2022

Katherine Kelly Vidal
*Director of the United States Patent and Trademark Office*